United States Patent [19]

Claussen et al.

[11] Patent Number: 5,524,481

[45] Date of Patent: Jun. 11, 1996

[54] MEASURE WET TANK ROUTINE COMPARING ITS PRESSURE TO THAT OF ASSOCIATED TIRE(S)

[75] Inventors: Stephen P. Claussen; James A. Beverly; Mark D. Boardman; Gary R. Schultz, all of Kalamazoo, Mich.

[73] Assignee: Eaton Corporation, Cleveland, Ohio

[21] Appl. No.: 329,930

[22] Filed: Oct. 27, 1994

[51] Int. Cl.[6] .................................................. B60C 23/10
[52] U.S. Cl. ............................................ 73/146.3; 152/416
[58] Field of Search .......................... 152/416; 73/146.3, 73/146.2

[56] References Cited

U.S. PATENT DOCUMENTS

| | | | |
|---|---|---|---|
| 3,101,111 | 8/1963 | Drechsel | 152/416 |
| 4,313,483 | 2/1982 | Brockmann | 152/416 |
| 4,640,331 | 2/1987 | Braun et al. | 152/416 |
| 5,293,910 | 3/1994 | Mohs | 73/146.2 X |
| 5,327,346 | 7/1994 | Goodell | 152/416 X |

*Primary Examiner*—Richard Chilcot
*Assistant Examiner*—Joseph L. Felber
*Attorney, Agent, or Firm*—Jennifer M. Stec; Howard D. Gordon

[57] ABSTRACT

A method for measuring the pressure of fluid in the wet tank (32) of a central tire inflation system (10) prior to initiating a tire pressure check sequence in order to ensure an accurate tire pressure reading by waiting for a sufficient wet tank pressure. To measure wet tank pressure, the wet tank (32) is isolated from the atmosphere and from a distribution manifold (55). Pressure is measured with an existing pressure transducer (44). Once wet tank pressure is sufficient, a normal tire pressure check sequence is allowed to begin.

12 Claims, 3 Drawing Sheets

5,524,481

MEASURE WET TANK ROUTINE COMPARING ITS PRESSURE TO THAT OF ASSOCIATED TIRE(S)

BACKGROUND OF THE INVENTION

This invention relates generally to central tire inflation systems (CTI Systems or CTIS) and, more particularly, to a method for achieving more accurate higher tire pressure measurements in a CTI system by ensuring sufficient wet tank pressure prior to initiating a tire pressure check sequence.

Central tire inflation systems are well known as may be seen by reference to U.S. Pat. Nos. 640,331; 4,678,017; 4,754,792; 4,782,879; 4,804,027; 4,883,106; 4,898,216; 4,922,946; 4,924,926; 5,174,839; 5,253,687; 5,180,456, the disclosures of which are incorporated herein by reference. Each of these systems allow a vehicle operator to remotely vary the air pressure in vehicle tires to dynamically alter the tractive ability of the tires depending upon the terrain and the load carried by the vehicle.

In order to accomplish this, a system controller calculates an optimum tire pressure for the current conditions under which the vehicle is operating, or otherwise receives a desired pressure directly from the vehicle operator. The controller attains the programmed tire pressure by issuing command signals to electronically controlled pneumatic components of the system which cooperate to inflate or deflate the tires as required. To achieve and/or maintain the desired tire pressure, the CTIS controller initiates a tire pressure check at vehicle start-up, periodically during vehicle operation and at various points in the inflate or deflate sequences. If the pressure check indicates that the current pressure is greater or less than the desired pressure, a deflate or inflate sequence is initiated.

However, in performing the tire pressure check sequence, it is assumed that pressure in the supply air reservoir, or wet tank, is greater than tire pressure. Due to the manner in which tire pressures are measured in the type of system described herein, a wet tank pressure below tire pressure will result in an incorrect measurement wherein tire pressure is misread as the lower wet tank pressure. Although wet tank pressure is usually sufficient, primarily due to a pressure switch which ensures at least a minimum wet tank pressure before the CTIS is allowed to consume any air, the ever increasing operating pressures of tires today are beginning to exceed this minimum pressure. This could lead to a situation where a measurement is taken when tire pressure is greater than wet tank pressure, thereby resulting in one or more improper inflate sequences which must subsequently be reversed by corresponding deflate sequences once a correct tire pressure measurement is obtained.

Current methods which assume an adequate wet tank pressure thus allow inaccurate tire pressure measurements when the wet tank or supply air pressure is lower than tire pressure. Guarding against this occurrence has required setting a maximum tire pressure which is lower than the minimum pressure switch setting and thus lower than necessary or even lower than recommended for a given condition and vehicle load. Therefore, there exists the need to ensure accurate higher tire pressure readings by making sure wet tank pressure is above tire pressure when the tire pressure reading is taken.

SUMMARY OF THE INVENTION

The present invention ensures more accurate high tire pressure readings by first measuring the air pressure in the system's wet tank. This is done with existing system hardware by isolating the wet tank from both a fluid distribution manifold and the atmosphere, and then measuring wet tank pressure with an existing pressure transducer. Wet tank pressure, if not above a threshold amount, is periodically sampled until determined to be high enough to allow an accurate tire pressure reading. Pressure from the supply is allowed to build between samplings if necessary. Once wet tank pressure is high enough, the tire pressure is measured.

This routine facilitates an accurate tire pressure measurement even when the tire pressure is initially higher than the wet tank pressure. In addition, an existing pressure transducer can be used to measure the pressure of the wet tank supply air thus necessitating no additional system hardware. These and other features and advantages of the present invention will become apparent from the following description taken in conjunction with the accompanying drawings.

DETAILED DESCRIPTION OF THE PREFERRED EMBODIMENT

Figure 1:
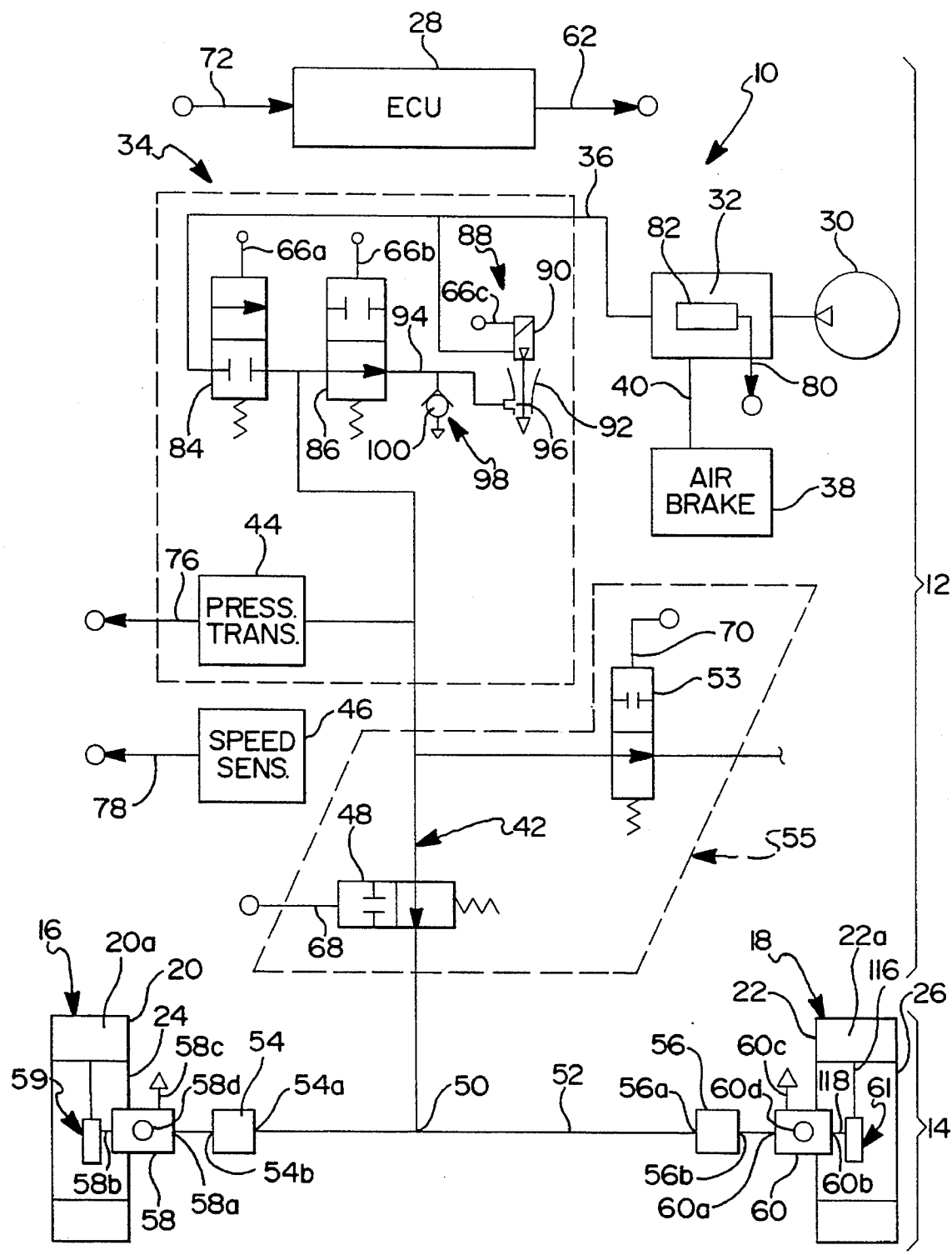
FIG. 1 is a schematic illustration of the present CTI system components.

Turning now to the drawings, the schematic of FIG. 1 illustrates a CTIS 10 for a vehicle having body/chassis mounted components 12 as well as axle mounted components 14. Axle mounted components 14 include left and right wheel assemblies 16 and 18 which may be attached to a steer or nonsteer axle, a drive or nondrive axle and/or a tandem axle. The vehicle is preferably, but not necessarily, of the heavy duty truck type or special duty type and wheel assemblies 16 and 18 may be of the single or dual wheel type. In this exemplary embodiment, CTIS 10 measures and controls the inflation pressure of interior volumes 20a,22a of tires 20,22 mounted on wheels 24,26 of wheel assemblies 16 and 18.

Figure 2:
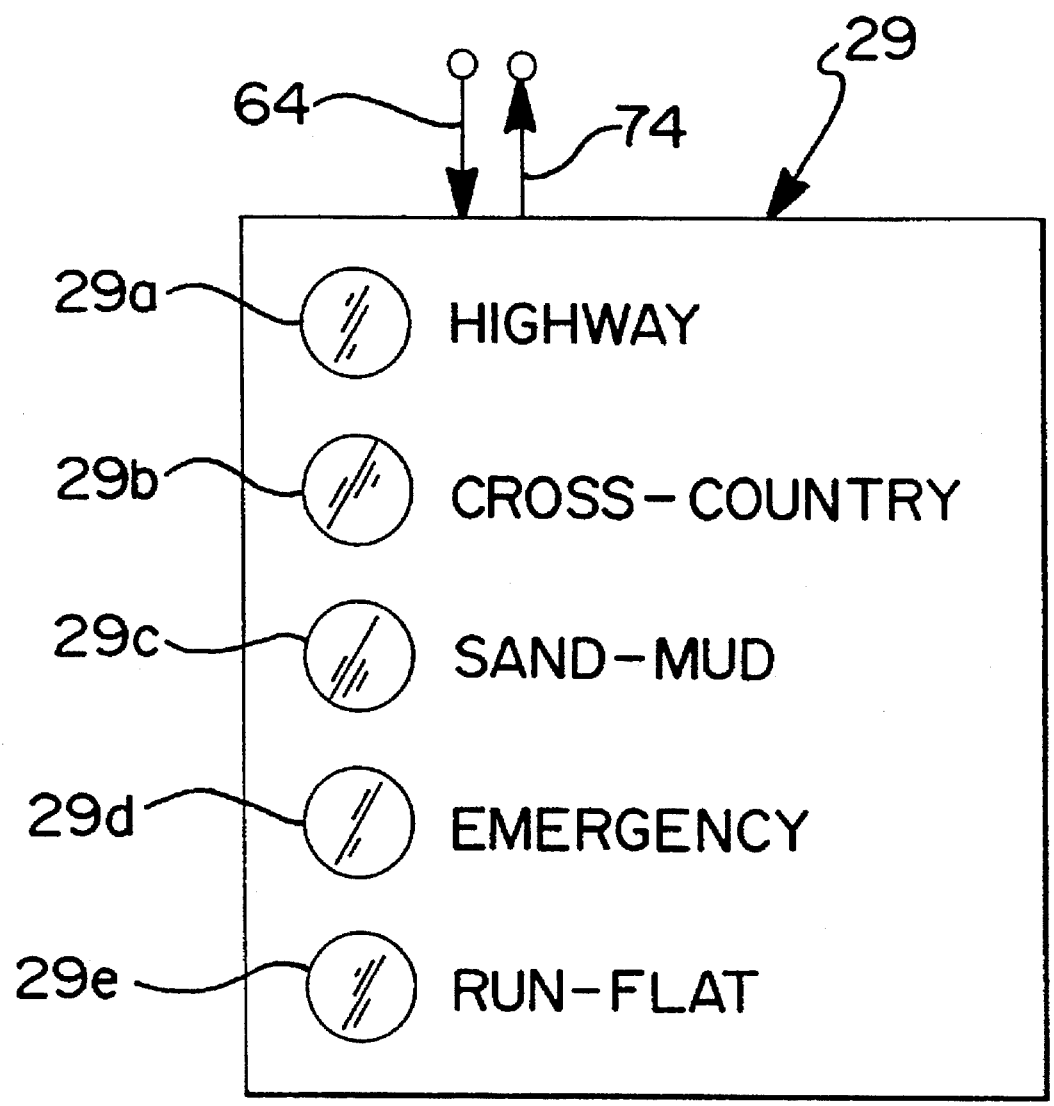
FIG. 2 is a schematic illustration of one example of an operator control panel for the system shown in FIG. 1.

The chassis mounted components 12 of CTIS 10 include a microprocessor-based electronic control unit (ECU) 28 which generates electronic control signals based upon input signals received from the vehicle operator, preferably through an operator control panel 29 such as that shown in FIG. 2, as well as from a number of additional sensors. A source of pressurized air, preferably a compressor 30 driven by the vehicle engine, provides pressurized air directly to an air tank or wet tank 32. Wet tank 32 serves as a reservoir for pressurized air provided by compressor 30 wherein pressure is allowed to build and moisture is removed. Clean, dry air from wet tank 32 is provided directly to a pneumatic control unit (PCU) 34 via a conduit 36 as well as to the vehicle's air brake system 38 via a conduit 40. PCU 34 is essentially a solenoid controlled manifold which in response to command signals received from ECU 28 controls the flow of air within CTIS 10.

An air manifold 42 fluidly connects chassis mounted components 12 to axle mounted components 14 and has mounted thereto a pressure transducer 44 which provides an electrical signal indicative of the pressure to which it is exposed. A vehicle speed sensor 46 provides ECU 28 with vehicle speed information. A normally open axle valve 48 is fluidly connected between manifold 42 and a T-shaped connector 50 in a conduit 52 extending between left and right tire assemblies 16 and 18. Alternatively, a pair of axle valves may be provided in order to separately connect the left and right tire volumes with manifold 42 and any number of additional axle valves 53 may be provided for other axle assemblies. Valves 48 and 53, along with portions of air manifold, collectively form a distribution manifold 55.

Conduit 52 fluidly communicates with tire volumes 20*a*, 22*a* via rotary seal assemblies 54,56, each seal having a non-rotatable port 54*a*,56*a* and a rotatable port 54*b*,56*b*. Examples of rotary seals of the type used herein may be seen by reference to U.S. Pat. Nos. 4,640,331; 4,804,027; 4,883,106 and 5,174,839. Wheel valves 58,60 each include an inlet port 58*a*,60*a* which communicates with conduit 52 via the associated rotary seal and an outlet port 58*b*,60*b* communicating with an associated tire volume via relief valve 59,61. Preferably, each wheel valve includes valve means 58*d*,60*d* for venting the associated tire volume to a vent or atmospheric opening 58*c*,60*c* in response to a command from ECU 28. The atmospheric opening may be at the wheel valve, as disclosed in U.S. Pat. Nos. 4,678,017; 4,782,879; 4,922,946 or 5,253,687 remote from the wheel valve as disclosed in U.S. Pat. No. 4,640,331.

When CTIS 10 is in an idle state, wheel valves 58 and 60 preferably isolate the tires from the inflation system in order to extend seal life by removing them from constant pressure. Wheel valves 58,60 block air communication between tire volumes 20*a*,22*a* and the associated valve inlets 58*a*,60*a* and atmospheric openings 58*c*,60*c* when air pressure at the inlet is substantially at atmospheric pressure. When the air pressure at inlets 58*a*,60*a* is a predetermined pressure above atmospheric pressure, valve means 58*d*,60*d* allow fluid communication between the tire volumes and conduit 52. When the air pressure at inlets 58*a*,60*a* is a predetermined pressure less (vacuum) than atmospheric pressure, fluid communication between the tire volumes and the associated atmospheric openings 58*c*,60*c* are allowed. Alternatively, however, CTIS 10 may be provided with wheel valves which are closed when air pressure at the inlets is substantially equal to atmospheric pressure, open for inflating the tires when the inlet air pressure is above a first predetermined minimum, and in a vent position when the inlet pressure is a predetermined pressure above atmospheric pressure and below tire pressure.

ECU 28 electronically controls the various pneumatic components of CTIS 10 by issuing command signals on an output 62. Output 62 is electrically connected to control panel 29 via a conductor 64, to pneumatic control unit 34 via conductors 66*a*,66*b*,66*c* and to axle valves 48,53 via conductors 68,70. The output signals are generated in response to input signals received by ECU 28 on an input 72. Input 72 receives signals from control panel 29 via a conductor 74, manifold pressure signals from pressure transducer 44 via a conductor 76, vehicle speed signals from speed sensor 46 via a conductor 78, and an air source pressure signal from a conductor 80 connected to a pressure switch 82 on air tank 32.

The operator control panel 29, illustrated in FIG. 2, is of the type which may be used on a military vehicle and includes various light emitting push switches 29*a*,29*b*,29*c*, 29*d*,29*e* respectively labeled "Highway", "Cross-Country", "Sand-Mud", "Emergency", and "Run Flat". Of course control panel 29 is preferably configured in accordance with a vehicle purpose and type and more or fewer switches may be provided, as may be suitable means for displaying current tire pressure, the selected mode or warning messages. Additional detail concerning panel 29 may be seen by reference to U.S. Pat. No. 4,754,792 and published European Patent Application 0,297,837. Switches 29*a* through 29*d* of the control panel 29 (shown in FIG. 2) instruct ECU 28 to maintain the vehicle tires within a predefined range of a desired demand pressure $P_D$ corresponding to the labeled type operation of switches 29*a*–29*d*. For example, activation of switch 29*a* may correspond to a tire pressure of 3.02 bar (45 psi), switch 29*b* to a pressure of 2.35 bar (35 psi), switch 29*c* to a pressure of 1.68 bar (25 psi), and switch 29*d* to a pressure of 0.8 bar (12 psi).

Pneumatic control unit 34 preferably includes a normally closed supply valve 84, a normally open control valve 86 and a vacuum generator 88 which includes a deflate valve 90 connected between wet tank 32 and a venturi 92. Supply valve 84 has an inlet fluidly connected to the positive pressure of the air source via conduit 36 and an outlet connected to manifold 2. Control valve 86 has an inlet connected to manifold 42 and an outlet connected via a conduit 94 to a small orifice 96 opening into the throat of venturi 92.

The venturi 92 produces a vacuum or negative air pressure in conduit 94 relative to ambient atmospheric air pressure in response to a deflate signal from ECU 28 on conductor 66*c* which opens solenoid valve 90 to allow a stream of air from the air source to flow through the venturi. Conduit 94 is also connected to a one-way vent valve 98 for effecting rapid venting of positive air pressure in conduit 94. Vent valve 98 includes a valving member 100 drawn to a closed position in response to a negative air pressure in conduit 94 and moved against a biasing force to an open position in response to positive pressure air in conduit 94.

CTIS 10, as thus described, is designed to automatically maintain tire pressure at or near a demand pressure $P_D$ as determined by ECU 28 based upon an operator selected pressure or mode of operation. The vehicle operator generally has the capability of commanding the system to decrease or increase tire pressure for improving tire traction or increasing load carrying capacity of the vehicle by merely activating the appropriate control panel switch. However, the system preferably automatically overrides the operator selected mode and increases tire pressure if the vehicle speed, as monitored by speed sensor 46, exceeds a predetermined speed for the selected tire pressure. CTIS 10 is similarly overridden by pressure switch 82 which acts as an electronic brake priority switch by preventing CTIS 10 from consuming air from wet tank 32 unless the vehicle brake system 38 is fully charged. Therefore, switch 82 must be closed in order for CTIS 10 to perform any function other than one which does not consume additional air, i.e. a deflate sequence.

When the vehicle ignition is energized and pressure switch 82 is closed, ECU 28 initiates a pressure check sequence of the tires on each of the axle assemblies. In addition, during vehicle operation, ECU 28 automatically initiates periodic pressure check sequences to maintain the desired pressure. If the pressure of tires on any of the axles is found to be a predetermined amount less than demand pressure $P_D$ for that axle, an inflation sequence is initiated for the axle or axles effected.

When enhanced or maximum traction is required, the vehicle operator may command reduced tire pressure by pushing the appropriate switches on control panel 29. ECU 28 then initiates a deflate sequence unless the vehicle speed indicated by sensor 46 is greater than a predetermined amount for the selected reduced pressure. A tire inflation sequence is similarly initiated if an increased load or terrain change lead the operator to push a switch corresponding to a higher demand pressure. A pressure check sequence may also be initiated at certain points in the middle of the inflate and deflate modes.

When CTIS 10 is in a steady state, neither inflating, deflating or performing a pressure check, valves 84,86 and axle valves 48,53 are in the positions indicated in FIG. 1. With vacuum source solenoid valve 90 closed, manifold 42, conduit 52 and each of the rotary seals 54,56 are vented to atmosphere through vacuum generator 88 and vent valve 98 via control valve 86. Wheel valves 58,60 have closed in response to this venting.

A pressure check sequence for tires that are part of axle mounted components 14 is initiated by energizing valves 86 and 53 to the closed positions and momentarily energizing valve 84 to the open position in order to provide a positive pilot air pressure sufficient to move valving means of wheel valves 58,60 allow fluid communication between the inlets and outlets thereof. Subsequent de-energization closes valve 84. With valve 84 closed and valves 48,58,60 open, the pressure in manifold 42 and conduit 52 soon equalizes to tire pressure. ECU 28 reads this pressure via signals from pressure transducer 44, compares the current tire pressure $P_c$ to the calculated demand pressure $P_D$ and initiates inflate/deflate sequences as required. If no further sequence is required, control valve 86 is de-energized and returned to an open position, thereby connecting the wheel valve assembly inlet ports to the vent through vacuum generator 88 and vent valve 98.

However, if the pressure provided in manifold 42 from the wet tank, i.e. the pressure in the wet tank at the time supply valve 84 was opened, is not greater than the pressure in the tires, sufficient pressure will not be provided to allow fluid communication from inlets 58a,60a to outlets 58b,60b of wheel valves 58,60. Therefore, pressurized air in manifold 42 will not flow into tire volumes 20a,22a until the pressure in manifold 42 equalizes to tire pressure. Instead, with this fluid communication blocked, pressure read by transducer 44 will be that of the wet tank when valve 84 is opened and not tire pressure. Therefore, in performing a tire pressure check sequence in this fashion, an important assumption is made. That is, the system assumes that the pressure read by transducer 44 in the pressure check sequence is in fact tire pressure and therefore that pressure in the wet tank is greater than that in the tire(s) being checked.

Figure 3:
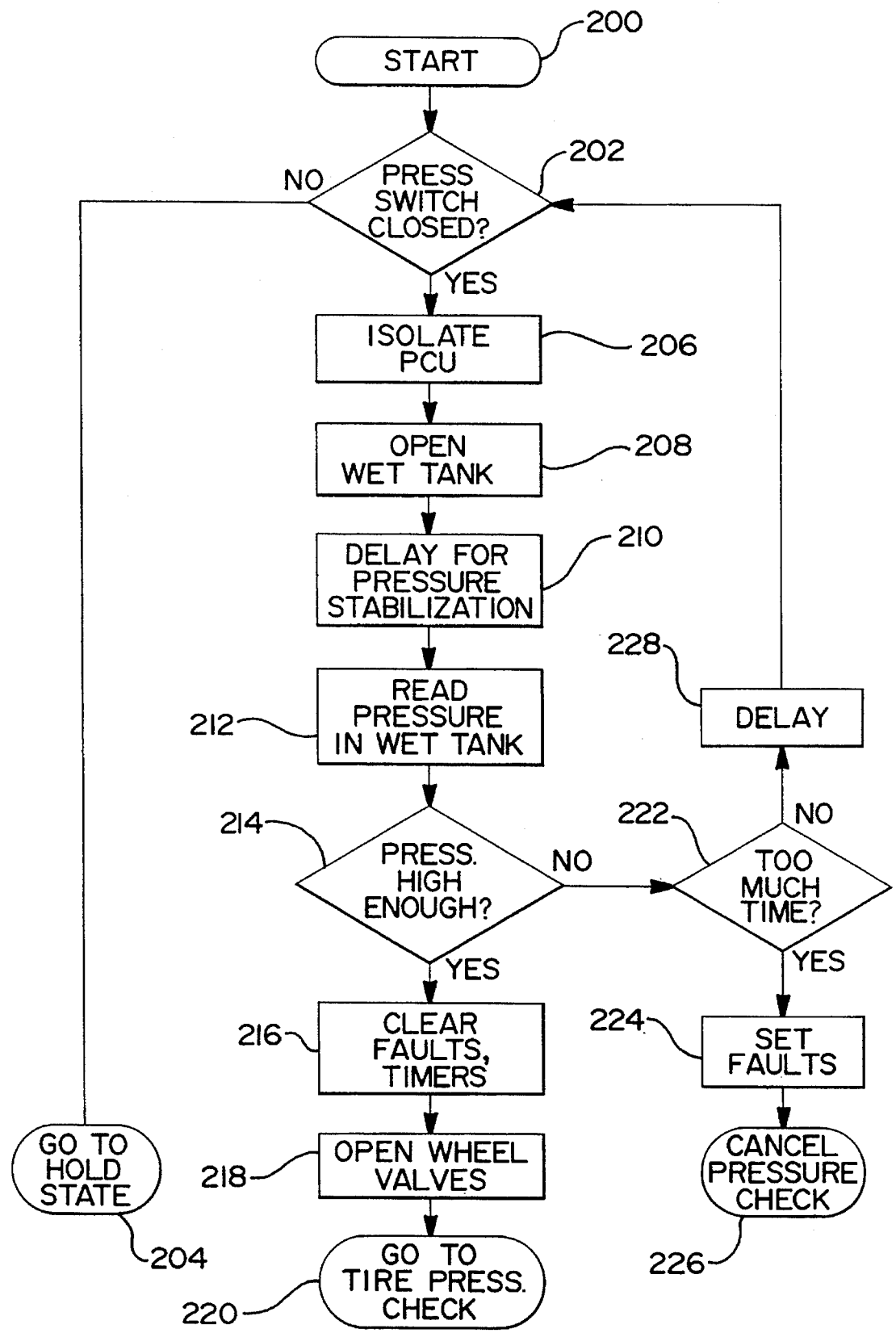
FIG. 3 is a flow chart which illustrates the wet tank pressure measurement routine of the present invention.

While this assumption is usually correct, there remains the chance that tire pressure is greater than wet tank pressure, especially with the high operating pressures demanded of today's tires. While pressure switch 82 ensures at least a minimum wet tank pressure, it is becoming desirable to inflate tires to even higher pressures. In order to provide this capability, the routine illustrated in FIG. 3 is performed by ECU 28 to ensure accurate tire pressure measurements, especially in the higher pressure ranges, irrespective of initial wet tank pressure. This routine is preferably implemented in software programmed into the microprocessor of ECU 28 but may be carried out in any appropriate manner.

The routine begins at 200 wherein a pressure check sequence has been initiated by ECU 28. The state of pressure switch 82 is checked at diamond 202. If switch 82 is not closed, thereby indicating insufficient pressure to higher priority brake system 38, ECU holds off on the pressure measurement sequence at 204. If, however, pressure switch 82 is closed, PCU 34 is isolated from atmospheric pressure and the distribution manifold at block 206 by closing valves 86, 48 and 53. Once PCU 34 is isolated, solenoid valve 84 is opened in block 208.

At block 210 the system delays monetarily to allow time for pressure in PCU 34 to stabilize. Once this is accomplished, pressure transducer 44 is read at block 212. Control then passes to diamond 214 wherein the measured pressure is evaluated to determine whether it is high enough to perform an accurate tire pressure check sequence. If it is, the pressure check sequence, as described above or performed in any other suitable manner, is initiated. Optionally, any timers or faults that have been previously set can be cleared at block 216. Wheel valves 58 and 60 are opened at block 218 and a tire pressure check is initiated at 220.

Although the determination of diamond 214 can be made in any number of ways, in the preferred embodiment the measured wet tank pressure is compared to the demand pressure $P_D$. If the measured pressure exceeds $P_D$ by at least a predetermined minimum amount, such as 10 psi, the tire pressure check sequence is allowed. Preferably, this predetermined amount is sufficient to also exceed an upper limit on the demand pressure range and also varies with different sets of operating conditions and loads carried.

If the wet tank pressure is not high enough to ensure an accurate tire pressure measurement, a determination is made at diamond 222 as to whether more than a predefined maximum amount of time has passed. If so, appropriate faults may be set at block 224 and the routine is cancelled at 226. Optionally, an error flag can be set. If, however, time remains additional delay is added at block 228 and control passes back to diamond 202 to ensure adequate air pressure for the brake system before the present routine begins again.

Thus, in this manner, adequate wet tank pressure is ensured prior to a tire pressure reading. This assures a more accurate tire pressure reading in ranges exceeding the minimum pressure switch setting than heretofore possible. In addition, the wet tank pressure reading is accomplished with existing hardware, specifically the pressure transducer, making the routine inexpensive to implement.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined in the following claims.

What is claimed is:

1. In a central tire inflation system including a wet tank for controllably supplying pressurized fluid to at least one inflatable tire, wherein it is desired that the pressure in said tire be within a predefined range of a specified demand pressure, a method of controlling said inflation system comprising the steps of:

(a) measuring the pressure of the fluid in said wet tank;

(b) if said wet tank pressure exceeds said demand pressure by at least a predetermined amount, measuring said tire pressure; and (c) if said wet tank pressure does not exceed said demand pressure by said predetermined amount, waiting for a preset period of time while pressure builds in said wet tank and returning to step (a) above.

2. The method of claim 1 wherein said wet tank is fluidly connected to said tire via a manifold and said pressures of said wet tank and said tire are measured in said manifold.

3. The method of claim 2 further comprising the step of allowing pressure in said manifold to stabilize before measuring.

4. The method of claim 2 wherein fluid flow in said manifold is controlled by electrically actuated valves.

5. The method of claim 1 wherein said predetermined amount is 10 pounds per square inch.

6. The method of claim 1 wherein the sum of said predetermined amount and said demand pressure is greater than an upper limit on said demand pressure range.

7. The method of claim 1 wherein said method is implemented in software executed by an electronic control unit.

8. The method of claim 1 wherein said wet tank is also fluidly coupled to a vehicle air brake system and wherein set method is performed only when the pressure in said wet tank is sufficient to fully charge said air brake system.

9. The method of claim 1 further comprising the step of setting a fault if said wet tank pressure does not exceed said demand pressure by said predetermined amount within a specified period of time.

10. In a central tire inflation system including a wet tank for controllably supplying pressurized fluid to at least one inflatable tire, said wet tank fluidly coupled between a source of pressurized air and an electronically controllable pneumatic control unit, said pneumatic control unit including at least one valved channel having a pneumatic control unit valve and means for measuring the pressure of fluid in said channel, said pneumatic control unit controlling the flow of fluid from said wet tank to said tire wherein said inflation system is controlled to maintain the pressure in said tire at a predetermined demand pressure and wherein a programmed tire pressure check sequence is performed to measure said tire pressure, a method of controlling said inflation system comprising the steps of:

pneumatically isolating said pneumatic control unit from said pressurized air source, from atmospheric pressure and from said tire;

fluidly connecting said pneumatic control unit to said pressurized air source;

measuring the pressure of fluid in said pressurized air source; and once said air source fluid pressure exceeds said demand pressure by a predetermined amount, initiating said programmed tire pressure check sequence.

11. The method of claim 10 wherein said pneumatic control unit valve is electronically actuable and wherein said method is performed by an electronic control unit which sends electrical actuating signals to said valve.

12. The method of claim 10 wherein said demand pressure comprises a predefined range of pressures.

* * * * *